Aug. 5, 1969 J. KORN 3,460,039

DISTANCE COMPENSATION CONTROL CIRCUIT

Filed July 7, 1966

Inventor:
Joel Korn

BY Spencer & Kaye

ATTORNEYS 3,460,039

DISTANCE COMPENSATION CONTROL CIRCUIT

Joel Korn, Backnang, Germany, assignor to Telefunken Patentverwertungsgesellschaft m.b.H., Ulm (Danube), Germany Filed July 7, 1966, Ser. No. 563,414
Claims priority, application Germany, July 8, 1965, T 28,954
Int. Cl. H04b *1/06, 7/14*
U.S. Cl. 325—2 8 Claims

ABSTRACT OF THE DISCLOSURE

In a communication transmission system having a number of amplifying repeater stations, and a separate circuit for energizing a number of the repeater stations, a circuit for setting the mean gain of each amplifier in accordance with its distance from the adjacent repeated stations and for compensating for variations in ambient temperatures, the improvement comprising: an indirectly heated thermistor at the repeater station having a heating coil connected into the energizing circuit and means at the energizing station for adjusting the portion of the energizing current flowing into the heating winding so that the mean resistance value of the thermistor equals the resistance value determined by the distance of said repeater from its adjacent repeater station or terminal, whereby the thermistor performs the dual function of selecting the mean repeater operating level for distance along the system and maintaining the level and changing its resistance value with changes in repeater ambient temperature.

The present invention relates to a circuit arrangement for controlling the operating level of repeater stations in a communication transmission system.

More particularly, the present invention relates to a circuit arrangement using a temperature sensing device for maintaining the operating level of a remotely energized repeater station at a desired level.

In communication transmission systems such as in carrier-frequency long-line telephone transmission systems, a great number of repeater stations have to be arranged along the system between the terminals. The repeaters amplify the signal attenuated by the transmission line. The mean gain of the repeaters must be set at a certain level depending on the distance from one repeater to the next.

The mean gain of the repeater is set for a mean operating temperature. However as the temperature varies, the attenuation of the cable will vary also. Therefore, some means must be provided for maintaining the repeater operating level at its desired value for different ambient temperatures. Also, a linesman has to adjust the mean gain of a particular repeater after the position and the resultant attenuation to the repeater is determined.

In carrier-frequency long-distance communication systems, most of the intermediate repeater stations are remotely energized with direct current. In longer distances, up to 120 kilometers, feeder stations are provided for energizing the repeaters. The remote energizing direct current is supplied via the inner conductor of a coaxial cable.

For various reasons, the different repeater sections can not all be made the same length. Accordingly, the mean amplification of each repeater must be set for the particular length of that station from the adjacent repeater or terminal. This is done by the linesman who solders on regulating resistors for varying the degree of negative feedback in stages.

Temperature sensors have been used in conjunction with these regulating resistors in order to control the operating level of the repeater. However, they have been used in such a manner that the effectiveness of the temperature sensors has been reduced.

It is, accordingly, an object of the present invention to provide a new and improved circuit arrangement for controlling the operating level of repeater stations in communication systems.

A second object of the present invention is to provide such a circuit arrangement which accurately controls the operating level through varying ambient temperatures.

Another object of the present invention is to provide a temperature responsive device at a repeater which serves the dual function of setting the mean gain according to the distance from the adjacent repeater and controlling the operating level of the repeater, according to the ambient temperature.

With the above objects in view, the present invention mainly consists of a circuit arrangement used in a communication system having a great number of amplifying repeater stations spaced between the terminals of the system. Most repeaters are remotely energized by a substantially constant energizing current. The circuit arrangement includes an indirectly heated thermistor at the repeater having a heating winding arranged to receive an adjustable portion of the energizing current, the resistance of the thermistor varying with changes in the heating current and in ambient temperature in a manner to maintain the desired operating level of the repeater. Also included at the repeater are adjusting means for adjusting the portion of the energizing current flowing through the heating winding so that the mean resistance value of the thermistor equals the resistance value determined by the distance of the repeater from its adjacent repeater station or terminal of the system. Thus the thermistor performs the dual function of adjusting the mean repeater gain to the distance along the system and maintaining the level by changing its resistance value with changes in repeater ambient temperature.

Additional objects and advantages of the present invention will become apparent upon consideration of the following description when taken in conjunction with the accompanying drawings in which.

Figure 1:
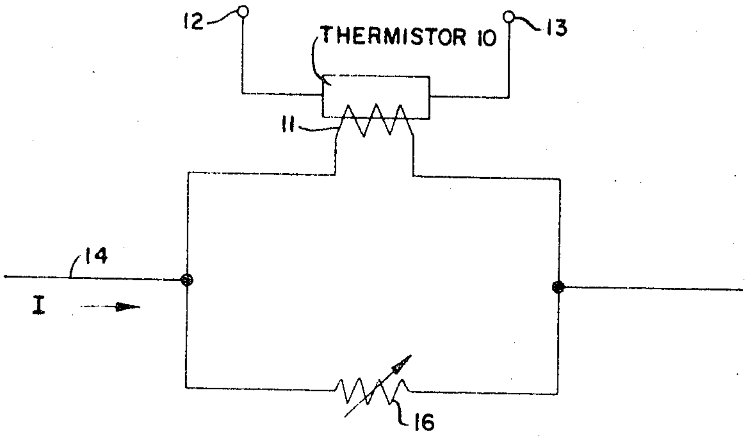
FIGURE 1 is an electrical schematic diagram of the regulating apparatus incorporating the principles of the present invention.

Referring now to the drawings and more particularly to FIGURE 1, the same shows a regulating thermistor 10 having a heating winding 11. The opposite ends of thermistor 10 are connected respectively to terminals 12 and 13. These, in turn, are connected in the feedback path of the amplifier (not shown) for controlling the negative feedback and thereby the operating level of the repeater.

The energizing current I for the repeater, which is substantially constant, is supplied along the conductor 14 which may be the inner conductor of a coaxial cable, for example. Connected in parallel with the winding 11 is an adjustable resistor 16, the value of which determines the portion of the energizing current flowing through the heater.

The resistance, $R_h$, of the thermistor is set forth in the following equation:

$$R_h = K_e^{(b/T)} \quad (1)$$

where K and $b$ are constants depending upon the material and the dimensions of the thermistor. T is the absolute temperature of the thermistor. By differentiating Equation 1 with respect to temperature, the temperature coefficient of the thermistor can be obtained as set forth below:

$$\frac{dR_h}{R_h dT} = -b/T^2 \qquad (2)$$

The temperature coefficient indicates the change of resistance of the thermistor per degree of temperature change.

The heating resistance of an indirectly heated thermistor is constant. If the power consumed in the heating resistance is N, the absolute temperature of the thermistor is increased by $$\Delta T = N/H \qquad (3)$$

where H is the dissipation or heating constant which indicates by how many milliwatts the power within the heater must be raised in order to increase the temperature by one degree. In this way, the mean temperature of the thermistor can be selected by adjusting the heating current. Thus, the mean amplification or operating level of the repeater may be selected for the particular distance which the repeater is spaced from the adjacent repeaters or terminal of the communication system.

Generally, it is found that the relative change in resistance required for controlling the operating level, that is, the required temperature coefficient, decreases with decreasing thermistor resistance. Equation 2 above indicates that this requirement is automatically satisfied by the thermistor. That is, both the resistance of the thermistor and its temperature coefficient decreases with increasing temperature.

In operation, the adjustable resistor 16 is varied so that the proper amount of energizing current flows through the winding 11 to set the mean resistance of the thermistor at a value which will provide the required feedback in the repeater. Thus, the proper operating level for the repeater is set as determined by the distance of the repeater from adjacent repeaters and the accompanying attenuation. For this purpose, the remote energizing current flowing through the conductor 14 must be substantially constant. However, this condition is already fulfilled by the normal remote energizing current for repeater stations.

Thus, by the above setting, the mean operating level is properly adjusted at installation time. The thermistor, being normally temperature responsive will react to changes in the ambient temperature to maintain the operating level of the repeater at the desired value. Therefore, the thermistor provides the dual function of both setting the mean gain according to the distance from the adjacent repeater and maintaining the operating level at the repeater, according to the ambient temperature.

FIGURE 1 shows the adjustable resistor as being constituted by a potentiometer which may be precisely adjusted to provide the proper mean resistance of the thermistor at installation time.

Figure 2:
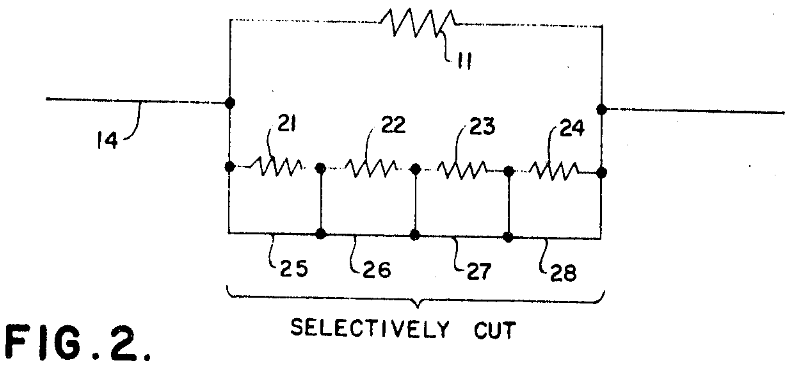
FIGURE 2 is a schematic diagram showing a second embodiment of the regulating apparatus.

FIGURE 2, shows the adjustable resistor as incorporating a pluralily of resistors 21, 22, 23, and 24 connected in series, each resistor being short-circuited by a respective shunt wire 25, 26, 27, 28. At installation, the short circuiting links may be cut as desired in order to provide the proper parallel resistance for the proper division of the current on conductor 14 for the winding 11.

The resistance values of the resistors 21–24 may be chosen in the ratio 1:2:4:8 . . . and so on, if more resistors are desired. In this way, with a few resistors, many different resistance values may be selected for the parallel resistance, i.e., with *n* resistors, $2^n$ different resistance values can be obtained.

It is known to superimpose a pilot voltage on the carrier-frequency signal. This pilot voltage is used for controlling feedback line regulators. Such regulators are relatively expensive. Accordingly, there is a tendency to equip the repeaters with an open loop control. This control is less expensive but also less accurate than a regulator. For this reason pilot regulators have to be provided at greater distances than the repeater stations to compensate for the resulting errors. The criterion used for the open loop controller is the ambient temperature of the cable since the amount of attenuation to be compensated depends on the temperature.

From the prior art, it was also known to use directly heated thermistors to control the level of repeaters in carrier frequency systems. The thermistors change the degree of amplification of the repeater with changes in the ambient temperature (See Nachrichtentechnische Zeitschrift (NTZ) 1965, No. 3, pages 154 to 158). Generally, the temperature sensor for level control or the adjusting resistor for attenuation correction for repeater distance, is arranged as a part of a voltage or current divider. Thus, the adjusting resistor of the prior art circuit arranged in series or in parallel with the thermistor reduces the effective regulating efficiency of the thermistor.

In contradistinction thereto, in the circuit incorporating the principles of the present invention, the thermistor operates at its highest efficiency since the mean resistance of the thermistor is used to set the mean operating level of the regulator at the repeater station. It will thus be appreciated that the present invention overcomes the above-discussed defects of the prior art.

It will be understood that the above description of the present invention is susceptible to various modifications, changes, and adaptations, and the same are intended to be comprehended within the meaning and range of equivalents of the appended claims.

What is claimed is:

1. In a communication transmission system having a great number of amplifying repeater stations spaced between the terminals of the system and means conducting a substantially constant separate energizing current to a plurality of said repeater stations, a circuit arrangement for setting the mean gain according to the distance from the adjacent repeater and controlling the operating level of the repeater, according to the ambient temperature comprising, in combination:

(a) an indirectly heated thermistor at the repeater having a heating winding connected to said energizing current conducting means and arranged to receive an adjustable portion of the energizing current, the resistance of said thermistor varying with changes in the heating current and in ambient temperature in a manner to maintain the desired operating level of the repeater; and (b) adjusting means at said repeater station for adjusting the portion of said energizing current flowing through said heating winding so that the mean resistance value of the thermistor equals the resistance value determined by the distance of said repeater from its adjacent repeater station or terminal, whereby said thermistor performs the dual function of selecting the mean repeater operating level for distance along the system and maintaining said level by changing its resistance value with changes in repeater ambient temperature.

2. A circuit arrangement as defined in claim 1 wherein said adjusting means is a potentiometer in parallel with said heating winding.

3. A circuit arrangement as defined in claim 1 wherein coaxial cables are used for said communication transmission system and the means conducting said energizing current is the inner conductor of the coaxial cable.

4. A circuit arrangement as defined in claim 1 wherein said adjusting means is an adjustable resistor arranged in parallel with the heating winding, the resistance value of said adjustable resistor being adjusted to a value so that the portion of the energizing current flowing through said heating winding provides said desired mean thermistor resistance value.

5. A circuit arrangement as defined in claim 4 wherein said adjustable resistor includes a plurality of resistors arranged in series.

6. A circuit arrangement as defined in claim 5 wherein the resistances of said resistors are in the ratio of 1:2:4:8.

7. A circuit arrangement as defined in claim 5 wherein said resistors are each originally short circuited by wires which may be cut to provide the desired resistance at the location of the repeater station.

8. In a communication transmission system having a great number of amplifying repeater stations spaced between the terminals of the system, and separate circuit means for energizing a number of repeater stations, the improvement comprising, in combination:

an indirectly heated thermistor at a repeater connected in the amplifier gain control circuit for selecting and controlling the operation level of said repeater station and a heating coil for the thermistor connected to said energizing circuit means.

References Cited

UNITED STATES PATENTS

| | | | |
|---|---|---|---|
| 2,084,135 | 6/1937 | Ford | 325—415 |
| 2,943,305 | 6/1960 | Walker | 340—228 |
| 2,992,120 | 7/1961 | Elsken | 340—228 X |
| 3,350,702 | 10/1967 | Herman | 340—228 |

RALPH D. BLAKESLEE, Primary Examiner

ALBERT J. MAYER, Assistant Examiner

U.S. Cl. X.R.

179—170